(12) United States Patent
Harrison et al.

(10) Patent No.: US 9,237,363 B2
(45) Date of Patent: Jan. 12, 2016

(54) DYNAMIC INJECTION OF METADATA INTO FLASH VIDEO

(75) Inventors: Declan Harrison, Belfast (GB); Stephen Wright, Belfast (GB)

(73) Assignee: OPENWAVE MOBILITY, INC., Redwood City, CA (US)

(*) Notice: Subject to any disclaimer, the term of this patent is extended or adjusted under 35 U.S.C. 154(b) by 0 days.

(21) Appl. No.: 13/372,340

(22) Filed: Feb. 13, 2012

(65) Prior Publication Data

US 2012/0209964 A1    Aug. 16, 2012

Related U.S. Application Data

(60) Provisional application No. 61/442,228, filed on Feb. 12, 2011, provisional application No. 61/478,422, filed on Apr. 22, 2011.

(51) Int. Cl.
| | | |
|---|---|---|
| G06F 15/16 | (2006.01) |
| H04N 21/2343 | (2011.01) |
| H04N 21/61 | (2011.01) |
| H04N 21/6377 | (2011.01) |
| H04N 21/81 | (2011.01) |

(52) U.S. Cl.
CPC ... *H04N 21/234309* (2013.01); *H04N 21/6125* (2013.01); *H04N 21/6377* (2013.01); *H04N 21/8126* (2013.01)

(58) Field of Classification Search
CPC .................................................. H04L 65/605
USPC ........................................................ 709/219
See application file for complete search history.

(56) References Cited

U.S. PATENT DOCUMENTS

| | | | | |
|---|---|---|---|---|
| 5,933,567 | A * | 8/1999 | Lane et al. ................ 386/200 |
| 6,445,738 | B1 * | 9/2002 | Zdepski et al. ......... 375/240.01 |
| 7,412,149 | B2 * | 8/2008 | Cohen et al. ................ 386/343 |
| 2003/0123849 | A1 * | 7/2003 | Nallur et al. ................. 386/68 |
| 2004/0001693 | A1 * | 1/2004 | Cavallerano et al. ......... 386/68 |
| 2006/0056510 | A1 * | 3/2006 | Van Der Schaar et al. ......... 375/240.12 |
| 2007/0040934 | A1 * | 2/2007 | Ramaswamy et al. ...... 348/385.1 |
| 2007/0297427 | A1 * | 12/2007 | Cho ............................ 370/401 |
| 2008/0120637 | A1 * | 5/2008 | Deiss ............................ 725/32 |
| 2009/0193457 | A1 * | 7/2009 | Conn ............................ 725/34 |
| 2009/0232221 | A1 * | 9/2009 | Cheng et al. ............ 375/240.24 |
| 2010/0254451 | A1 * | 10/2010 | Melnyk et al. .......... 375/240.03 |
| 2011/0134991 | A1 * | 6/2011 | Gregotski et al. ....... 375/240.01 |
| 2011/0145431 | A1 * | 6/2011 | Momchilov et al. ........ 709/231 |
| 2011/0194838 | A1 * | 8/2011 | Meijer ......................... 386/249 |
| 2012/0059954 | A1 * | 3/2012 | Gilson ......................... 709/246 |
| 2012/0191805 | A1 * | 7/2012 | Fee et al. ..................... 709/217 |

* cited by examiner

*Primary Examiner* — Hamza Algibhah

(57) ABSTRACT

A method for dynamically configuring a video stream, including: identifying player control metadata attributes for an input video stream, wherein the input video stream is received from an origin server; storing the identified metadata attributes to a memory device; and dynamically inserting the metadata attributes into an output video stream in real-time.

12 Claims, 4 Drawing Sheets

DYNAMIC INJECTION OF METADATA INTO FLASH VIDEO

CROSS-REFERENCE TO RELATED APPLICATIONS

This application claims the benefit of priority of U.S. Provisional Patent Application No. 61/442,228 entitled "Dynamic Injection of Metadata into Flash Video" and filed Feb. 12, 2011. This application also claims the benefit of priority of U.S. Provisional Patent Application No. 61/478,422 entitled "Dynamic Injection of Metadata into Flash Video" and filed Apr. 22, 2011. Both of these provisional patent applications are incorporated by reference herein in their entirety.

BACKGROUND

When video content is streamed to a client device over a remote connection—whether over a network connection, an Internet connection or otherwise—the video stream may require optimization to allow for continuous playback over the connection due to bandwidth, hardware, or other limitations. Content providers frequently provide their own media player on which the video stream is to be played, for example, in a flash player for a web browser. The media player is generally downloaded with the video stream and the video stream is played back at the client device on the media player.

Because the content providers often provide their own media player, the original video stream from the origin server may include attributes or customization for the video stream that allows the video stream to interact correctly with the media player and take advantage of the media player's specific functionalities. Optimization or re-encoding of the video stream in real time over a connection may cause problems with playback of the video at the client device because the optimization may remove or alter the player control attributes, leading to serious usability problems or a poor user experience.

SUMMARY

Embodiments of a system are described. In one embodiment, the system is a video configuration system. The system includes: a parser to identify player control metadata attributes for an input video stream received from an origin server; a memory device to store the identified metadata attributes; and an insertion engine to dynamically insert the metadata attributes into an output video stream in real-time. Other embodiments of the system are also described.

Embodiments of a computer program product are also described. In one embodiment, the computer program product includes a computer readable storage device to store a computer readable program, wherein the computer readable program, when executed by a processor within a computer, causes the computer to perform operations for dynamically configuring a video stream. The operations include: identifying player control metadata attributes for an input video stream, wherein the input video stream is received from an origin server; storing the identified metadata attributes to a memory device; and dynamically inserting the metadata attributes into an output video stream in real-time. Other embodiments of the computer program product are also described.

Embodiments of a method are also described. In one embodiment, the method is a method for dynamically configuring a video stream. The method includes: identifying player control metadata attributes for an input video stream, wherein the input video stream is received from an origin server; storing the identified metadata attributes to a memory device; and dynamically inserting the metadata attributes into an output video stream in real-time. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
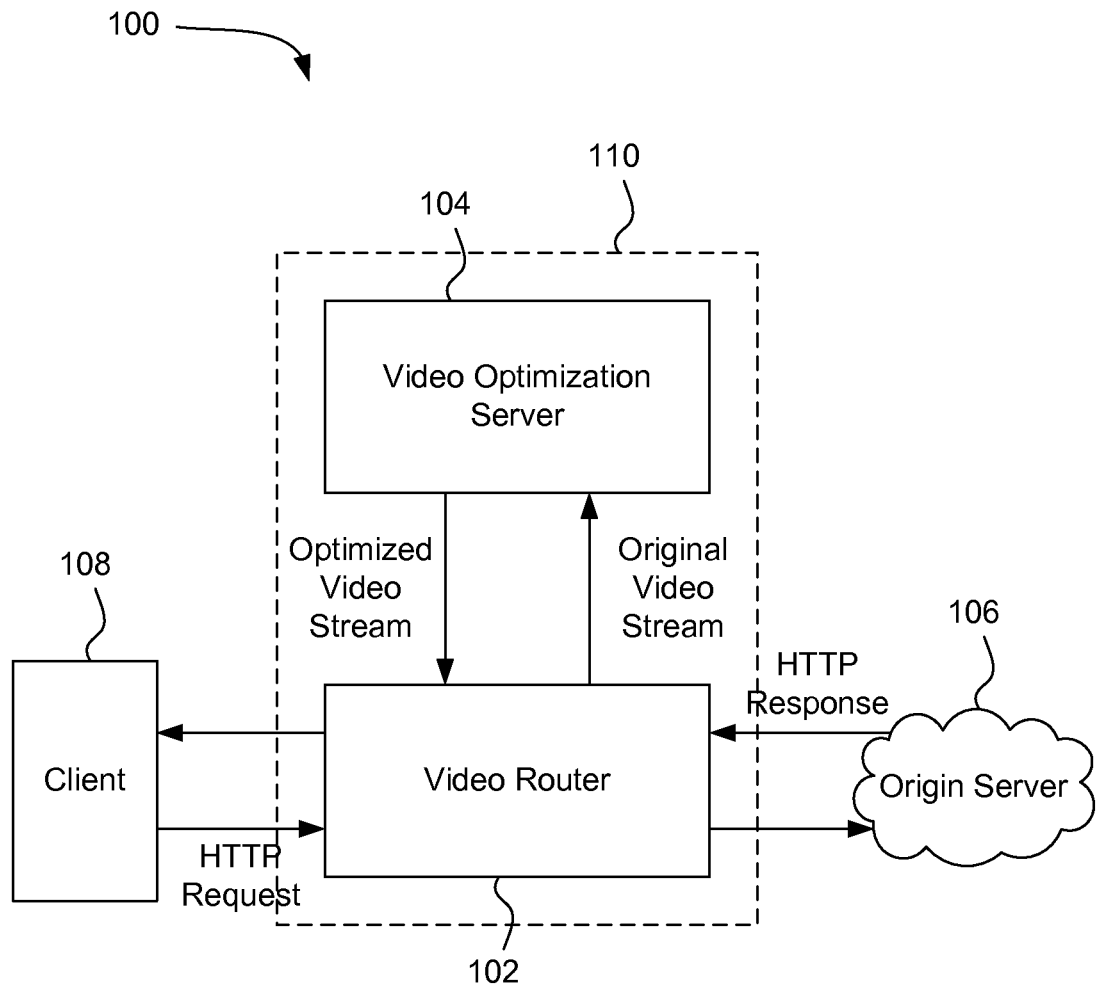
FIG. 1 depicts a schematic diagram of one embodiment of a video configuration system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the embodiments present a video optimization server (VOS) for dynamically optimizing flash video. Specifically, the VOS inspects each (original) video metadata attribute in the input for player control specific attributes. The VOS then dynamically inserts each relevant attribute it finds into the newly created video bit stream before the video bit stream is written to the client device over the network. This allows the video or other media content to be played at the client device using a media player provided by the content provider.

Raw or uncompressed media content may be very large, and thus may take up a large amount of bandwidth or resources to stream over a remote connection. Media content is frequently optimized when the content is streamed or transferred over a remote connection, or for computing devices with limited resources, to reduce resource usage and to provide continuous or better playback performance at a client device. When dynamically re-encoding flash video in real time over a network stream, the metadata for newly re-encoded flash video generally does not contain the required attributes to control how certain player controls are placed in the resultant video displayed at the client device. Invalid placement of the control can often result in serious usability problems for the client device and customer. While the system and method are described herein as being implemented for flash video, the system and method may be used for any type of video or media, including MPEG-4 (MP4), audio files, and others.

In some embodiments of flash video players, player controls are dependent on the metadata in an "onMetaData" tag in the flash video. The metadata typically controls the time-related player controls, e.g., the "seek bar" indicates how much video has been played and how much video is left to play. The seek bar can also indicate the total time of the video and other time attributes of the video.

Many content providers supply their own flash player. Because the content providers supply their own flash player, the client device downloads the content provider's player as part of the hypertext transfer protocol (HTTP) transaction.

Some conventional video configuration systems dynamically optimize flash video content by intercepting the original video from a video source and optimizing the content by creating a new video bit stream. The new bit stream generates a new default set of metadata attributes that may be different than the metadata attributes included in the original video bit stream. If the default attributes for the player controls do not match the original player control attributes, as frequently occurs, the newly generated metadata does not provide the correct player controls during seek requests, resulting in a poor user experience. For example, if the attributes describe the function of the seek bar, then the seek bar control for the re-encoded flash video will be is incorrect. A seek bar control that is incompatible with the flash video player provided by the content provider may result in incorrect time display data provided to the client device, incorrect operation of the seek bar, or other errors.

FIG. 1 depicts a schematic diagram of one embodiment of a video configuration system 100. In one embodiment, the video configuration system 100 includes a video router 102 and a video optimization server (VOS) 104 between an origin server 106 and a client 108. Although the video configuration system is shown and described with certain components and functionality, other embodiments of the video configuration system 100 may include fewer or more components to implement less or more functionality.

In one embodiment, the VOS 104 includes a proxy 110 for a connection between the client 108 and the origin server 106. The connection may be include hypertext transfer protocol (HTTP) transfers, or may include some other connection that allows the client 108 to communicate remotely with the origin server 106. The proxy 110 is located between the client 108 and the origin server 106 to intercept the video stream from the origin server 106 to the client 108. The proxy 110 may also intercept the request from the client 108 to the origin server 106, such that the proxy 110 is able to determine when a request for media has been made by the client 108 to the given origin server 106. The proxy 110 may intercept any incoming and outgoing traffic for the client 108, including to computing devices on the same network as the client 108 and to computing devices on other networks or systems. The proxy 110 may perform various operations, including, but not limited to, the operations of the system described herein.

In one embodiment, the proxy 110 receives an HTTP request from the client 108. The HTTP request corresponds to a request for media content from the origin server 106. The proxy 110 may perform operations on the HTTP request before forwarding the HTTP request to the origin server 106. The proxy 110 then intercepts the HTTP response to the request. The HTTP response may include media content and other data. The proxy 110 may perform various operations, including optimization of the content or other operations. In one embodiment, the proxy 110 includes the VOS 104 and the video router 102. In another embodiment, the proxy 110 only includes the video router 102, and the VOS 104 is accessed by the proxy 110.

When the video router 102 receives the media content in the HTTP response, the video router 102 may perform operations on the media content—such as management or logging operations—or may send the media content directly to the VOS 104 unaltered, such that the VOS 104 receives the original, uncompressed media content. In some embodiments, the video router 102 or the VOS 104 may determine that the media content should be optimized to allow for better playback performance at the client 108. The optimized content includes the same images/sound as the raw media content, though the content is generally compressed. The determination to optimize the content may be based on system resources at the client 108, the proxy 110, or anywhere in the video configuration system 100 that might affect playback performance at the client 108. The determination to optimize may be based on the quality or size of the connection along the path from the client 108 to the origin server 106.

In one embodiment, when content is passed to the VOS 104 from the video router 102:

1. The VOS 104 identifies the player control metadata attributes in the input stream.
2. The VOS 104 inserts the player control metadata attributes into the output video stream.
3. The VOS 104 then starts compressing the input video bit stream before sending the input video bit stream to the video router 102.
4. The video router 102 forwards the video bit stream to the client 108.

The attributes may correspond to any function of the media player provided with the media content in the input stream or any attribute corresponding to the media content. This may allow the proxy 110 to perform operations on the media content in addition to the principles described herein. In one embodiment, the metadata attributes include time attributes, some of which may be displayed to the user or with which the user may interact. In another embodiment, the metadata attributes include a frame rate, compression rate, display size, image resolution, volume control, or other attributes.

Figure 2:
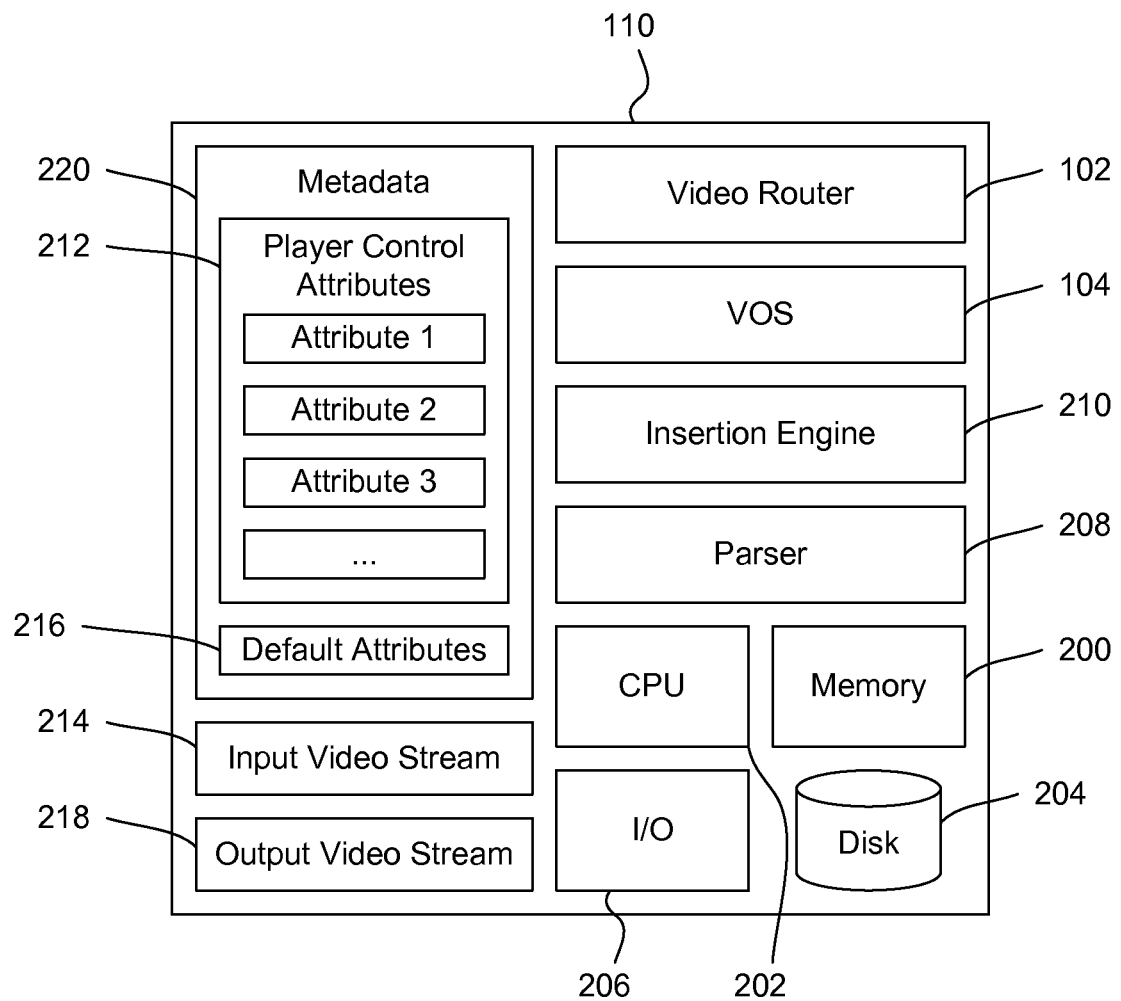
FIG. 2 depicts a schematic diagram of one embodiment of the proxy of FIG. 1.
Figure 4:
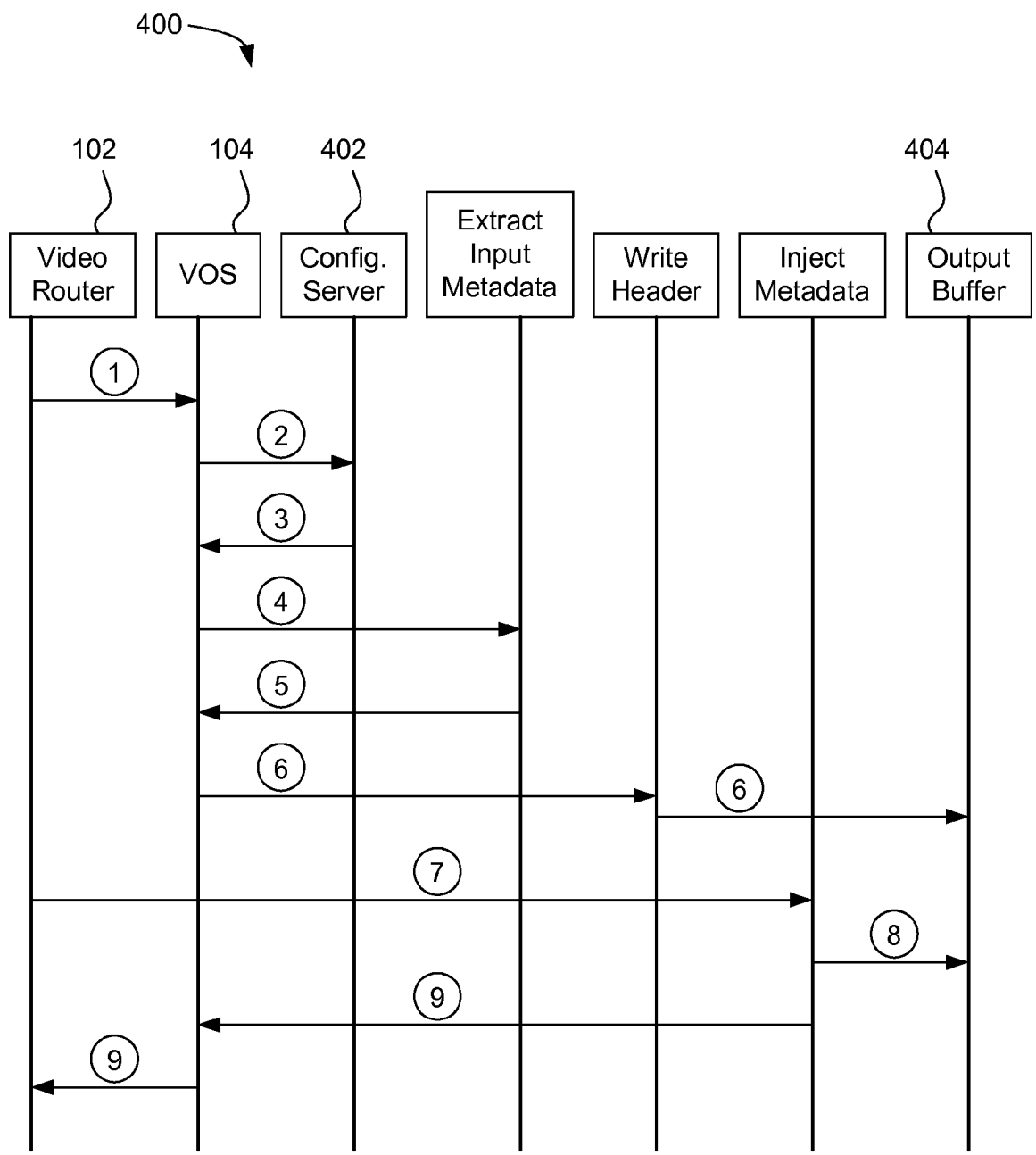
FIG. 4 depicts a flow chart diagram of one embodiment of a method for injecting metadata into flash video.

FIG. 2 depicts a schematic diagram of one embodiment of the proxy 110 of FIG. 1. The depicted proxy 110 includes various components, described in more detail below, that are capable of performing the functions and operations described herein. In one embodiment, at least some of the components of the proxy 110 are implemented in a computer system. For example, the functionality of one or more components of the proxy 110 may be implemented by computer program instructions stored on a computer memory device 200 and executed by a processing device 202 such as a CPU. The video configuration system 100 may include other components, such as a disk storage drive 204, input/output devices 206, a parser 208, a video router 102, an insertion engine 210, and a VOS 104. Some or all of the components of the video configuration system 100 may be stored on a single computing device or on a network of computing devices. The proxy 110 may include more or fewer components than those depicted herein. In some embodiments, the video configuration system 100 includes additional components to those described herein in conjunction with the proxy 110. In some embodiments, the proxy 110 may be used to implement the methods described herein as depicted in FIG. 4.

In one embodiment, the proxy 110 includes a parser 208. The parser 208 is configured to identify attributes 212 corresponding to player controls in metadata 220 for the input video stream 214. The attributes 212 for the input video stream 214 may be inserted into the input video stream 214 at the origin server 106 when the origin server 106 prepares the input video stream 214 to be sent to the client 108. The attributes 212 may correspond to player controls that allow the video input stream 214 to be played on a media player that is specific to the origin server 106. The proxy 110 receives the input video stream 214 from the origin server 106 after the origin server 106 has prepared the media content in response to a request from the client 108.

In one embodiment, the parser 208 parses any metadata attributes 212 in the input video stream 214 and determines which attributes 212 are the player control attributes 212 while ignoring other attributes 212. For example, the player control attributes 212 may include time attributes for the media player, such as seek time, time offset, total time, etc. In some embodiments, the player control attributes 212 include other attributes 212. The parser 208 may store the identified player control metadata attributes 212 in the memory device for later reference or use. In some embodiments, the parser 208 may also identify and store attributes 212 other than player control attributes 212.

In one embodiment, the parser 208 also includes a VOS 104 to optimize the input video stream 214 in real time, i.e., while the media content is being streamed from the origin server 106 to the client 108. The VOS 104 may optimize the input video stream 214 according to available resources, connection speed/bandwidth, a preset configuration, or any other reason. Optimizing the bandwidth may include compressing and/or re-encoding the input video stream 214 and writing the input video stream 214 to the output video stream 218.

While re-encoding the input video stream 214, however, the player control metadata attributes 212 may be removed from the re-encoded video stream and replaced by a set of default metadata attributes 212. The default attributes 216 may be determined by a configuration of the media optimizer. In one embodiment, the default attributes 216 include player controls for a specific media player. Because the default attributes 216 may not be the same as the original attributes 212 from the input video stream 214, the output video stream 218 may not be compatible with the media player. The proxy 110 includes an insertion engine 210 to replace the default attributes 216 in the output video stream 218 with the attributes 212 identified in the input video stream 214. The insertion engine 210 dynamically inserts the attributes 212 into the output video stream 218 in real time after the output video stream 218 has been optimized, in one embodiment. The attributes 212 are inserted into the output video stream 218 before the output video stream 218 is sent to the client 108 so that the media content may be played with full utilization of the media player when the output video stream 218 is sent to the client 108.

In one embodiment, the proxy 110 includes a video router 102 that receives the input video stream 214 from the origin server 106. The video router 102 sends the input video stream 214 to the VOS 104. In one embodiment, the VOS 104 includes the parser 208, the media optimizer, and the insertion engine 210. When the VOS 104 has finished performing the operations for parsing the metadata, optimizing the input video stream 214, and inserting the attributes 212 into the output video stream 218, the VOS 104 sends the optimized output video stream 218 to the video router 102, which then forwards the output video stream 218 to the client 108.

Figure 3:
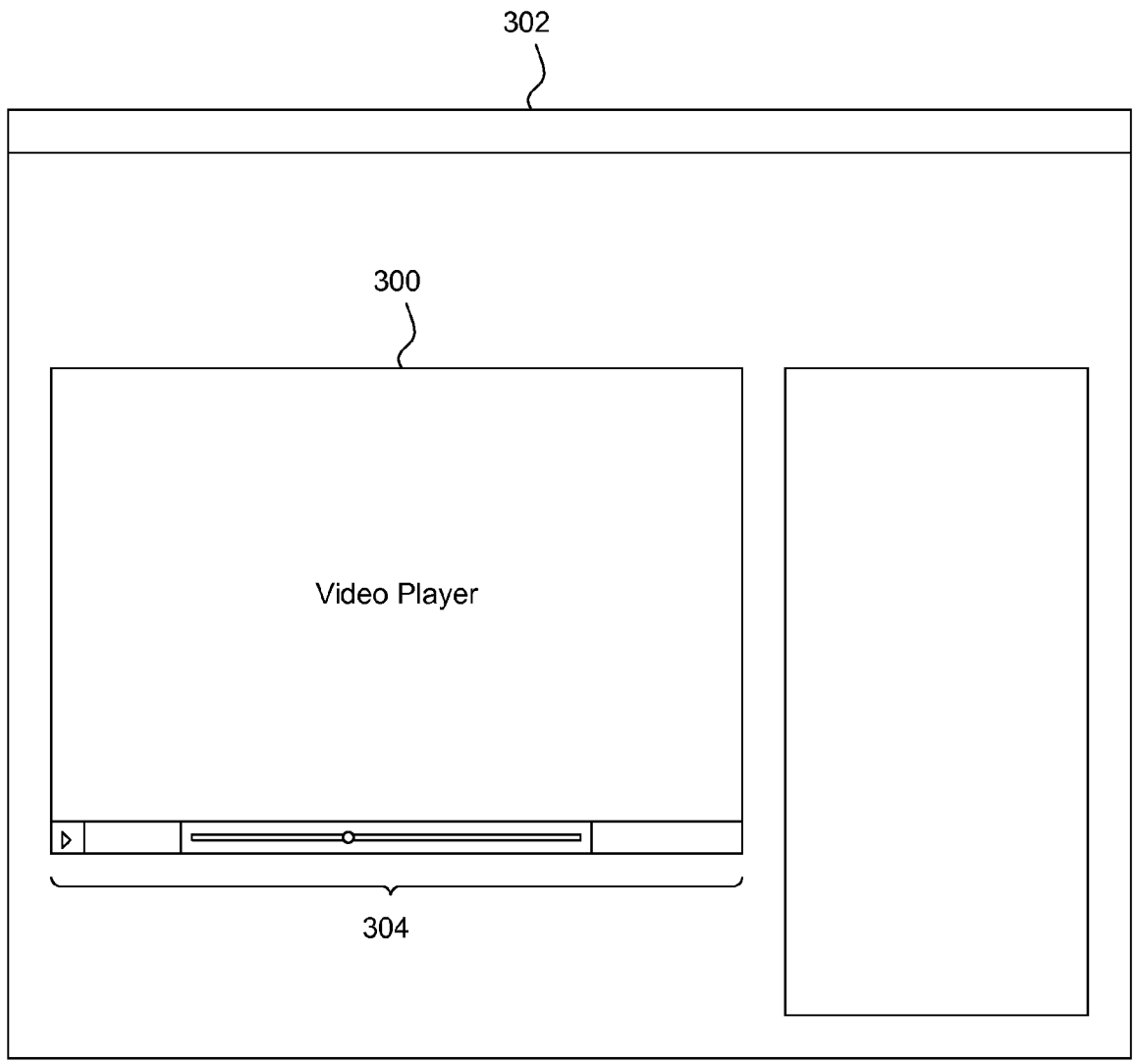
FIG. 3 depicts a schematic diagram of one embodiment of a media player.

FIG. 3 depicts a schematic diagram of one embodiment of a media player 300. The media player 300 may be an embedded media player 300 within a web browser 302 or other web interface. While the media player 300 is shown having certain controls, functionalities, and layouts, the media player 300 may include any controls, functionalities, or layouts. The media player 300 may be any media player 300 corresponding to a particular web site or origin server 106. In one embodiment, the media player 300 is a flash player, though the system described herein may be used in conjunction with other types of media players 300.

In one embodiment, the media player 300 includes various player controls 304, such as a seek bar that allows a user to visualize the amount of video played and the amount of video left to be played. The seek bar may also be manipulated to control the playback of the media content. Some examples include duration, start time, seekability of the video file, or other values or attributes 212. The attributes 212 may be numeric values, Boolean types, or other attribute types. The media player 300 may also include other controls 304 that allow the user to see or manipulate other attributes 212 of the video within the media player 300 provided. Some examples may include a play/pause button, fast forward/rewind controls, video resolution, volume controls, and other player controls 304 that may be included in a media player 300. The system may include any attributes 212 in the video stream that provide better compatibility between the video and the video player 300, or that may provide additional usability and convenience to the user.

FIG. 4 depicts a flow chart diagram of one embodiment of a method 400 for injecting metadata 220 into flash video. Although the method 400 is described in conjunction with the video configuration system 100 of FIG. 1, embodiments of the method 400 may be implemented with other types of video configuration systems 100.

In one embodiment, the VOS 104 and video router 102 of the video configuration system 100 performs some or all of the operations of the method 400 for flash video content to be played in a flash video player, as described below:

1. The video router 102 uses an HTTP Post request to send flash video content to the VOS 104. HTTP headers tell the VOS 104 which compression profile to use to optimize the flash video content. This profile may be defined in the configuration.
2. In one embodiment, the VOS 104 then requests metadata attributes 212 from a configuration server 402. The attributes 212 obtained from the configuration server 402 indicate to the VOS 104 which attributes 212 to look for in the input flash video.
3. The configuration server 402 returns the configured attributes 212 to the VOS 104.
4. In one embodiment, the VOS 104 parses the input flash video "onMetaData" tag to see if the tag contains any of the configured metadata attributes 212. In other embodiments, the VOS 104 parses a corresponding tag in the input video stream 214 for the configured metadata attributes 212.
5. The VOS 104 stores the name, type and value(s) of any attributes 212 present in the original input video stream 214 in a memory device 200. In one embodiment, the VOS 104 stores additional data related to the attributes 212 found in the original input video stream 214.
6. The VOS 104 then writes the flash video header to an output buffer 404. The header contains a set of default generated metadata attributes 216 that may not be the same as the attributes 212 from the original input video stream 214. In some embodiments, the default metadata attributes 216 are generated when the VOS 104 optimizes the input flash video.
7. The VOS 104 injects any of the attributes 212 stored in the memory device 200 from operation 5 above into the output stream 218 before the output stream 218 is written out over the network connection. In some embodiments, only the configured attributes 212 found in the original input video stream 214 are injected into the output stream 218, and the value type matches the input. Inserting the configured attributes 212 into the output stream 218 allows the client 108 to play the video on the flash player provided by the content provider.
8. The VOS 104 rewrites the output buffer 404 before any physical input/output occurs. In one embodiment, the buffer 404 includes the default attributes 216 and player control metadata attributes 212 from the original video, providing compatibility with the video player. In another embodiment, the VOS 104 replaces the corresponding default attributes 216 with the configured attributes 212 from the original input stream 214, such that the buffer may only include some of the default attributes 216 along with the configured attributes 212.
9. After the player control metadata attributes 212 are written to the output buffer 404, the metadata and output video stream 218 are then sent to the client 108 via the video router 102.

The system is very flexible because it allows configuration of the metadata attributes 212 to be inserted into the output video stream 218. As new sites offering streaming flash video become available, the system and method described herein are able to identify the player control's specific flash attribute names in the input video stream 214 and insert these names into the configuration. The VOS 104 is automatically able to find these values and their type (Number, String, Boolean etc) in the original flash video and insert the correct values into the corresponding output video stream 218.

The system described herein, in one embodiment, is included in a HTTP proxy server. The system may also use another network element to signal to the VOS 104 to start compressing video. This operation may be currently performed by the video router 102 in a media optimization product.

1. On process startup, the VOS 104 listens for an HTTP Post request from the MOP.
2. Each HTTP response that contains video content sent to the client 108 device that has not been cached is redirected to the VOS 104 by the MOP. The VOS 104 sends back the original or re-encoded video content to the MOP, which then forwards the content on to the client 108 device. In one embodiment, the system runs as long as the HTTP Proxy is active.

An embodiment of a video configuration system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to configure a video stream.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for dynamically configuring a video stream, comprising:
   at a video configuration system between an origin server and a client device:
      intercepting an input video stream from the origin server;
      identifying player control metadata attributes from the input video stream;
      storing the identified player control metadata attributes to a memory device;
      optimizing the input video stream to create an output video stream, wherein optimizing the input video stream further comprises compressing the input video stream; and
      dynamically inserting the identified player control metadata attributes into the output video stream in real-time before forwarding the output video stream to the client device;
   wherein:
      optimizing the input video stream further comprises replacing the identified player control metadata attributes for the input video stream with default player control metadata attributes in the output video stream; and
      dynamically inserting the identified player control metadata attributes into the output video stream comprises replacing the default player control metadata attributes from the output video stream with the identified player control metadata attributes.

2. The method of claim 1, wherein the identified player control metadata attributes comprise time-related player controls for the input video stream.

3. The method of claim 1, wherein the input video stream is a flash or MPEG-4 file format.

4. The method of claim 1, wherein the identified player control metadata attributes correspond to player controls in a media player provided by the origin server.

5. A computer program product, comprising:
   a computer readable storage device to store a computer readable program, wherein the computer readable program, when executed by a processor within a computer, causes the computer to perform operations for dynamically configuring a video stream, the operations comprising:
      at a video configuration system between an origin server and a client device:
         intercepting an input video stream from the origin server;
         identifying player control metadata attributes from the input video stream;
         storing the identified metadata attributes to a memory device;
         optimizing the input video stream to create an output video stream, wherein optimizing the input video stream further comprises compressing the input video stream; and
         dynamically inserting the identified metadata attributes into the output video stream in real-time before forwarding the output video stream to the client device;
      wherein:
         optimizing the input video stream further comprises replacing the identified player control metadata attributes for the input video stream with default player control metadata attributes in the output video stream; and
         dynamically inserting the identified player control metadata attributes into the output video stream comprises replacing the default player control metadata attributes from the output video stream with the identified player control metadata attributes.

6. The computer program product of claim 5, wherein the identified player control metadata attributes comprise time-related player controls for the input video stream.

7. The computer program product of claim 5, wherein the input video stream is a flash or MPEG-4 file format.

8. The computer program product of claim 5, wherein the identified player control metadata attributes correspond to player controls in a media player provided by the origin server.

9. A video configuration system, comprising:
   a proxy configured to intercept an input video stream from an origin server;
   a parser to identify player control metadata attributes from the input video stream;
   a memory device to store the identified player control metadata attributes;
   a media optimizer to optimize the input video stream to create an output video stream, wherein optimizing the input video stream further comprises compressing the input video stream; and
   an insertion engine to dynamically insert the identified player control metadata attributes into the output video stream in real-time;
   a router to forward the output video stream to a client device after the identified player control metadata attributes have been inserted into the output video stream;
   wherein:
   the media optimizer is further configured to optimize the input video stream by replacing the identified player control metadata attributes for the input video stream with default player control metadata attributes in the output video stream; and
   the insertion engine is further configured to dynamically insert the identified player control metadata attributes into the output video stream by replacing the default player control metadata attributes from the output video stream with the identified player control metadata attributes.

10. The system of claim 9, wherein the identified player control metadata attributes comprise time-related player controls for the input video stream.

11. The system of claim 9, wherein the input video stream is a flash or MPEG-4 file format.

12. The system of claim 9, wherein the identified player control metadata attributes correspond to player controls in a media player provided by the origin server.

* * * * *